United States Patent Office 3,124,743
Patented Mar. 10, 1964

3,124,743
POTENTIAL MEASURING APPARATUS INCLUDING AMPLIFIER MEANS WITH INPUT AND OUTPUT CHOPPERS AND PLURAL FEEDBACK PATHS
John H. Riseman, 13 Mount Auburn St., Cambridge 38, Mass.
Filed Feb. 26, 1960, Ser. No. 11,251
11 Claims. (Cl. 324—30)

The present invention relates in general to electrical apparatus responsive to an input potential delivered by an exceptionally high impedance source and more particularly concerns a novel system for measuring the pH of a chemical solution with a high degree of precision and reproduceability. This system is capable of accurately measuring exceptionally small changes in potential delivered by a very high impedance pH cell.

It is well-known in the art to make potential measurements of a high impedance source by using an electrometer tube in the input amplification stage. The use of a chopper for converting an input D.-C. signal into an A.-C. signal is commonly employed followed by conventional A.-C. coupled amplifying stages for amplifying the chopped signal. The amplified signal may then be reconverted into a D.-C. signal by means such as a chopper at the output synchronized with that at the input so that the direction of the error in establishing a null may be obtained.

While these techniques are effective in many D.-C. amplification systems, serious inaccuracies may result from aggregating these techniques for measuring the output potential of a pH cell of the glass electrode type. It is believed that the reason for these inaccuracies is due to the input chopper contacts becoming contaminated or corroded with use so that a small E.M.F. develops between the chopper contacts. In addition, it also seems as if an effective capacitance of the order of several hundred micromicrofarads appears across the closed contacts. The result is that during the closed contact period, a small charge accumulates across the chopper contacts. When the chopper contacts open, this small charge gives rise to a large voltage transient since the effective capacitance between the moving arm or reed, which supports moveable contacts, and ground is small compared to that between the closed contacts. Basically, this is similar to the problem of a pair of opposed plates having a capacitance C and storing a fixed charge Q, being suddenly pulled apart. Since the potential between the plates, $V=Q/C$, and Q is essentially constant due to the exceptionally high series resistance presented by the electrometer tube to which the arm is attached, the incremental rise in voltage corresponds essentially to the incremental decrease in capacitance.

Further difficulties arise from any change in hum level in the vicinity of the chopper since the amplifier input is extremely susceptible to hum pickup when the chopper contacts are open.

Accordingly, the present invention has an important object, the provision of method and means for detecting with great accuracy input potentials delivered by a high impedance source.

A more specific object of the present invention is to provide an exceptionally accurate electronic pH meter.

Still another object of the invention is to provide apparatus in accordance with the preceding objects in which chopping techniques are employed in a manner which eliminates the effects of the undesired characteristics set forth above.

According to the invention, means are provided to chop or modulate the input D.-C. signal potential delivered by a high impedance source, such as a pH electrode. The chopped input signal is first amplified by an electrometer tube and then by D.-C. coupled stages. The D.-C. component of the output signal from these stages is inversely fed back to the electrometer tube so that the D.-C. gain is exceptionally stable and nearly unity while the A.-C. gain is very high. The A.-C. component of the output signal is then detected or rectified by means synchronized with the input chopping or modulating means, and the detected or rectified signal provided thereby is delivered to an indicating device, such as a meter. Where the input and output are chopped in synchronism, the dwell time of the contacts at the output is preferably shorter than that at the input. It is important to D.-C. couple the stages following the electrometer tube and provide a high gain D.-C. feedback path to the electrometer tube in order to eliminate the effects of offset voltages at the output caused by noise due to contact potentials developed across the input contacts.

Numerous other features, objects and advantages of the invention will become apparent from the following specification when read in connection with the accompanying drawing in which.

Figure 1:
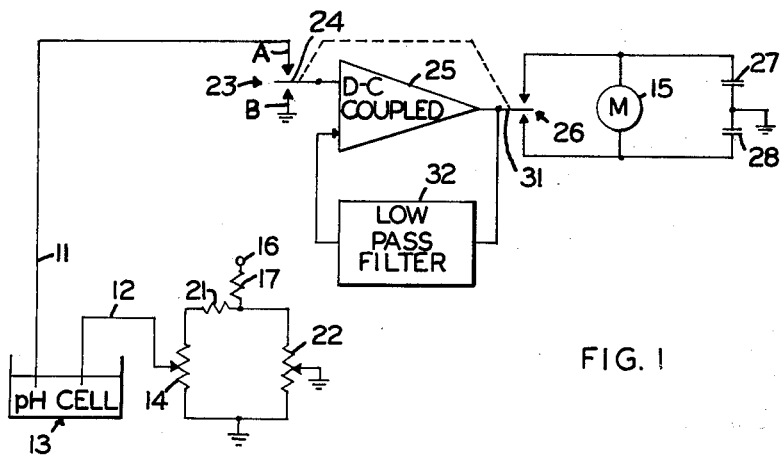
FIG. 1 shows a diagrammatic representation of a system according to the invention.

With reference now to the drawing and more particularly FIG. 1 thereof, there is illustrated a diagrammatic representation of an embodiment according to the invention. The potential between electrodes 11 and 12 of a pH cell 13 is balanced out by the potential on the arm of a calibrated potentiometer 14 until the meter 15 is zeroed, indicating that the potential on electrode 11 is then at ground potential. This means that the potential on the arm of potentiometer 14 is equal and opposite to that between terminals 11 and 12.

The potential for potentiometer 14 is supplied from a source connected to terminal 16 to deliver a current through potentiometer 14 through a resistor 17 connected to the junction of potentiometer 22 and the series combination of a calibrated potentiometer 14 and a resistor 21 whose value is chosen such that potentiometer 14 is correctly calibrated, which combination is in parallel with potentiometer 22.

An input chopper 23 alternately connects the input arm 24 between the A terminal connected to the input of the D.-C. coupled amplifier 25 and the B terminal connected to ground. The output chopper 26 alternately charges condensers 27 and 28 and the potential across the series combination of these condensers is indicated by meter 15. The charge paths for these condensers are in parallel due to the connection to ground at their junction.

As indicated by the broken line, the arm 24 of input chopper 23 is synchronized with the arm 31 of output chopper 26. However, it is preferred that the dwell time of arm 24 on the contacts connected to electrode 11 be greater than the dwell time of arm 31 on either of its contacts. This mode of operation is preferred because it prevents transients produced when the input chopper contacts are open from appearing at the output of the rectifier contacts.

Figure 2:
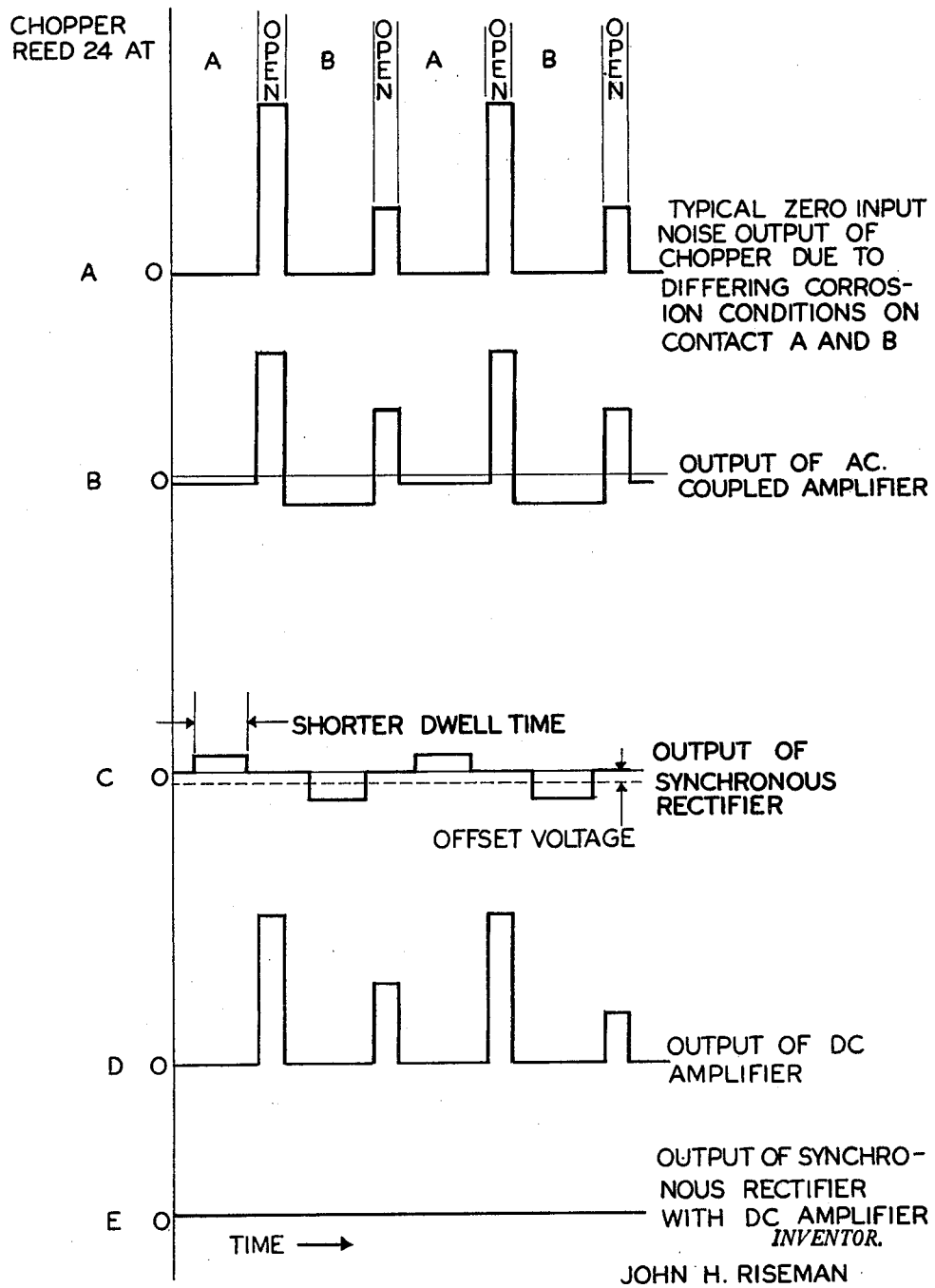
FIG. 2 shows a graphical representation of signal waveforms to illustrate the corrective effects of the invention.

The time relationship between the signals on arms 24 and 31 is represented by the respective waveforms in FIGS. 2A and 2D plotted to a common time scale. If amplifier 25 were A.-C. coupled, the output would appear as in FIG. 2B in which there would be an offset potential due to the contact potential across the input chopper 23. The synchronous detector output would then appear as in FIG. 2C. This last mentioned effect is eliminated by arranging amplifier 25 with D.-C. coupled stages and inversely feeding back the D.-C. component of its output through low pass filter 32 to provide low gain D.-C. amplification with exceptional stability while still providing very high A.-C. gain to enhance null indication sensitivity. The output of the synchronous rectifier is then as shown in FIG. 2E.

Figure 3:
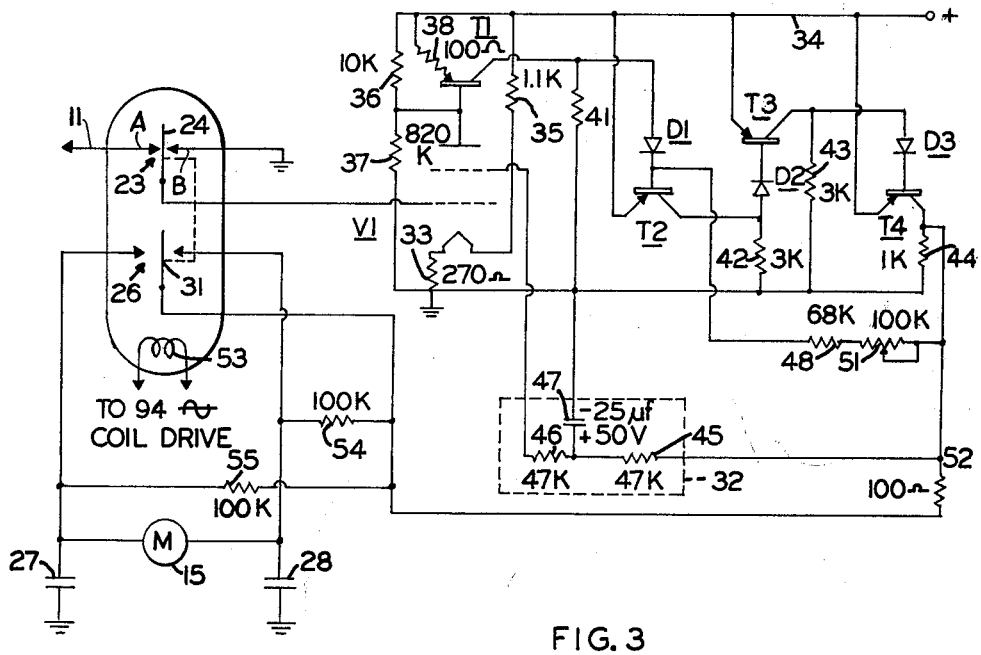
FIG. 3 is a schematic circuit diagram of a preferred amplifying and indicating circuit according to the invention.

Referring to FIG. 3, there is shown a schematic circuit diagram of the electronic amplification system. Where applicable, reference symbols used in FIG. 1 identify corresponding elements in FIG. 3. Typical circuit parameter values are set forth in the drawing by way of example to illustrate the best mode now contemplated for practicing the invention.

Tube V1 is an electrometer tube, such as Raytheon type CK 5889. Its control grid is directly connected to the arm 24 of chopper 23. Its directly-heated cathode is connected to ground by resistor 33 and to the source of positive potential on bus 34 by resistor 35 to establish the proper filament current grid voltage.

A load resistor 36 is connected between the plate of tube V1 and bus 34. The base of transistor T1 is also connected to the latter plate, resistor 37 functioning as a D.-C. return for the base to ground.

The emitter of transistor T1 is connected to bus 34 by emitter resistor 38. A collector load resistor 41 is connected between ground and the collector of transistor T1. The collector of transistor T1 is direct coupled to the base of transistor T2 by Zener diode D1.

The emitter of transistor T2 is connected to bus 34. Its collector is coupled to ground by the collector load resistance 42. The latter collector is also direct coupled to the base of transistor T3 by Zener diode D2. The emitter of transistor T3 is connected to the bus 34. The collector of the latter is coupled to ground by collector load resistor 43 and direct coupled to the base of transistor T4 by Zener diode D3.

The emitter of transistor T4 is connected to bus 34. Its collector is coupled to ground by collector load resistance 44.

Electrometer tube V1 and transistor T1—T4 and associated circuitry form five cascaded D.-C. coupled stages. A different number of stages may be employed provided that means are provided for inversely feeding back the D.-C. component of the output signal. In this embodiment, this is accomplished by utilizing an odd number of D.-C. coupled stages with the feedback path comprising a low pass filter formed by resistors 45 and 46 and capacitor 47, the filter output at the end of resistor 46 being connected to the screen grid of tube V1 to provide the desired D.-C. inverse feedback. An A.-C. feedback path is also provided between the collector T4 and the base of transistor T2 through the series combination of resistor 48 and potentiometer 51. Decreasing the resistance of the latter potentiometer increases the inverse A.-C. feedback to make the amplifier less sensitive to overload from hum pickup at the inputs. The latter condition might occur during the short time interval when the arm 24 is moving from one fixed contact to the other.

The output at the collector of transistor T4 is coupled by a resistor 52 to arm 31 of the output chopper 26. Resistor 52 also has the function of developing an A.-C. feedback signal which is fed through resistor 48 and potentiometer 51. When the chopper contacts are closed, the magnitude of the feedback signal is small since the small capacitive reactance of capacitors 27 and 28 make resistor 52 the effective load of transistor T4. When the contacts open, the effective load on transistor T4 is resistor 44 so that the gain is now higher. The A.-C. feedback path prevents overloading during this period.

A chopper coil 53 is energized with an A.-C. signal, preferably of a frequency, such as 94 c.p.s., unharmonically related to 60 cycles, to vibrate arms 24 and 31. By mechanically linking vibrating arms 24 and 31 and arranging the fixed contacts A and B of input chopper 23 physically closer to arm 24 than the fixed contacts of output chopper 26 are to arm 31, the signal waveform relationship shown in FIG. 2 may be established. Resistors 54 and 55 are connected between the arm 31 at each contact to prevent transients from being developed when power is applied to coil 53 which might damage transistor T4.

In the circuit of FIG. 3, the Zener diodes are preferably approximately 6 volt Zener diodes and the four transistors may be type 2N34 transistors.

An embodiment of the invention according to FIGS. 1 and 3 has been operating satisfactorily providing a null indication stable to 50 mv. a day with a pH cell having an impedance of 100 megohms.

While this specific embodiment of the invention solves problems encountered particularly in making pH cell measurements, those skilled in the electrical art will find numerous other uses for the apparatus and techniques described herein. Numerous other modifications of and departures from the specific embodiment described herein, such as the use of all electronic switching, the use of stable D.-C. amplifiers, not utilizing feedback and the use of different types of indicating devices may be practiced by those skilled in the art without departing from the inventive concepts. Consequently, the invention is to be construed as limited only by the spirit and scope of the appended claims.

What is claimed is:

1. Electrical apparatus comprising, an input terminal, a reference terminal, a D.-C. coupled amplifier having an input and output, means for periodically direct-coupling said amplifier input alternately between said input terminal and said reference terminal at a first rate, a feedback network for inversely feeding back signals at said output to the direct-coupled path between said input and said output, said feedback network inversely feeding back D.-C. components from said output while rejecting signals having spectral components of said first rate and higher, a pair of output terminals, means for direct-coupling said output terminals alternately between said pair of output terminals in synchronism with said alternate switching between said reference terminal and said input terminal, means for providing an indication of the direct potential between said output terminals, and means for establishing the time said output is connected to said output terminals as less than the time said input is connected to said input terminal and said reference terminal.

2. Apparatus in accordance with claim 1 and further comprising, a pair of equal condensers connected in series between said output terminals and having their junction connected to said reference terminal, and a D.-C. meter connected across said capacitors.

3. Apparatus in accordance with claim 2 and further comprising, a pair of equal resistors connected between said amplifier output and each of said output terminals respectively.

4. Electrical apparatus comprising, a high impedance potential source connected to an input terminal, a reference terminal, a D.-C. coupled amplifier having an input and output, a chopper for periodically direct-coupling said amplifier input alternately between said input terminal and said reference terminal at a first rate, a feedback network for inversely feeding back signals at said output to the direct-coupled path between said input and said output, said feedback network inversely feeding back D.-C. components from said output while rejecting signals having spectral components of said first rate and higher, and a second feedback network for inversely feeding back A.-C. signal components from said output to said direct-coupled path.

5. Electrical apparatus comprising, a high impedance potential source connected to an input terminal, a reference terminal, a D.-C. coupled amplifier having an input and output, a chopper for periodically direct-coupling said amplifier input alternately between said input terminal and said reference terminal at a first rate, a feedback network for inversely feeding back signals at said output to the direct-coupled path between said input and said output, said feedback network inversely feeding back D.-C. components from said output while rejecting signals having spectral components of said first rate and higher, a pair of output terminals, means for direct-coupling said output alternately between said pair of output terminals in synchronism with said alternate switching between said reference terminal and said input terminal to rectify the signal at said output, means for providing an indication of the direct potential between said output terminals, and means for connecting said output terminals to said output for time intervals less than the time intervals in which said input is connected to said reference terminal and said input terminal.

6. Electrical apparatus in accordance with claim 5 wherein said D.-C. coupled amplifier comprises an electrometer tube having at least a control grid and a screen grid, said input being direct coupled to said control grid, said feedback network comprising a low pass filter coupling said output to said screen grid.

7. Electrical apparatus in accordance with claim 6 and further comprising, a second feedback network for inversely feeding back A.-C. signal components at said output to said direct path.

8. Electrical apparatus in accordance with claim 6 wherein said source comprises a pH cell in series with a controllable potential source adjustable to exactly oppose the potential of said cell, said exact opposition being indicated by an indication of zero potential difference across said output terminals.

9. Electrical apparatus comprising, a high impedance potential source connected to an input terminal, a reference terminal, a D.-C. coupled amplifier having an input and output, a chopper for periodically direct-coupling said amplifier input alternately between said input terminal and said reference terminal at a first rate, a feedback network for inversely feeding back signals at said output to the direct-coupled path between said input and said output, said feedback network inversely feeding back D.-C. components from said output while rejecting signals having spectral components of said first rate and higher, said D.-C. coupled amplifier comprising an elec-trometer tube having at least a control grid and a screen grid, said input being direct-coupled to said control grid, said feedback network comprising a low pass filter coupling said output to said screen grid, and a second feedback network for inversely feeding back A.-C. signal components at said output to said direct path.

10. Electrical apparatus comprising,
an input terminal for connection to a high impedance signal source,
an electrometer type amplifier tube having at least a control electrode and an output electrode,
a reference terminal,
a chopper for periodically direct-coupling said control electrode alternately between said input terminal and said reference terminal,
means defining a signal output,
stable amplifying means coupling said output electrode to said means defining a signal output,
a pair of output terminals,
means for direct-coupling said signal output alternately between said pair of output terminals in synchronism with said alternate switching between said reference terminal and said output terminal,
means for providing an indication of the direct potential between said output terminals,
and means for establishing the time said signal output is connected to said output terminals as less than the time said input is connected to said input terminal and said reference terminal.

11. Electrical apparatus in accordance with claim 10 and further comprising, a feedback network for feeding back signal components from said output to said stable amplifying means to prevent overloading thereof.

References Cited in the file of this patent
UNITED STATES PATENTS

| | | |
|---|---|---|
| 2,622,192 | Tarpley | Dec. 16, 1952 |
| 2,724,022 | Williams et al. | Nov. 15, 1955 |
| 2,778,990 | Howe et al. | Jan. 22, 1957 |
| 2,828,466 | Staunton | Mar. 25, 1958 |
| 2,832,734 | Eckfeldt | Apr. 29, 1958 |
| 2,970,266 | Molloy et al. | Jan. 31, 1961 |

OTHER REFERENCES

Cederbaum et al.: Rev. Sci. Instr. 26, 1955, pp. 745–747.